United States Patent
Oishi

(10) Patent No.: US 8,670,631 B2
(45) Date of Patent: Mar. 11, 2014

(54) IMAGE PROCESSING APPARATUS, CONTROL METHOD AND COMPUTER-READABLE MEDIUM STORING A PROGRAM

(75) Inventor: Tetsu Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 752 days.

(21) Appl. No.: 12/876,995

(22) Filed: Sep. 7, 2010

(65) Prior Publication Data

US 2011/0069326 A1    Mar. 24, 2011

(30) Foreign Application Priority Data

Sep. 18, 2009  (JP) ................................ 2009-218006
Sep. 1, 2010   (JP) ................................ 2010-196099

(51) Int. Cl.
*G06K 9/42*   (2006.01)
*G06K 9/48*   (2006.01)

(52) U.S. Cl.
USPC ......................................... 382/258; 382/199

(58) Field of Classification Search
USPC ................... 382/199, 203, 258, 298, 299, 190
See application file for complete search history.

(56) References Cited

U.S. PATENT DOCUMENTS 6,954,550 B2 * 10/2005 Fujieda ..................... 382/199

FOREIGN PATENT DOCUMENTS

JP    4-93892 A    3/1992

* cited by examiner

*Primary Examiner* — Daniel Mariam
(74) *Attorney, Agent, or Firm* — Fitzpatrick, Cella, Harper & Scinto

(57) ABSTRACT

An image processing apparatus which performs reduction processing for rendering data in accordance with a reduction ratio, the apparatus comprises edge extraction unit that extracts edges from a contour of an object in the rendering data; saved line specification unit that specifies, out of lines including the edges extracted by the edge extraction unit, lines each having an outer shape feature of the object as saved lines which are lines not subjected to thinning processing; and thinning processing unit that thins out lines other than the saved lines in the object, thereby performing the reduction processing for the rendering data, wherein the saved line specification unit specifies saved lines by determining the outer shape feature of the object in accordance with characteristics of the edges.

16 Claims, 17 Drawing Sheets

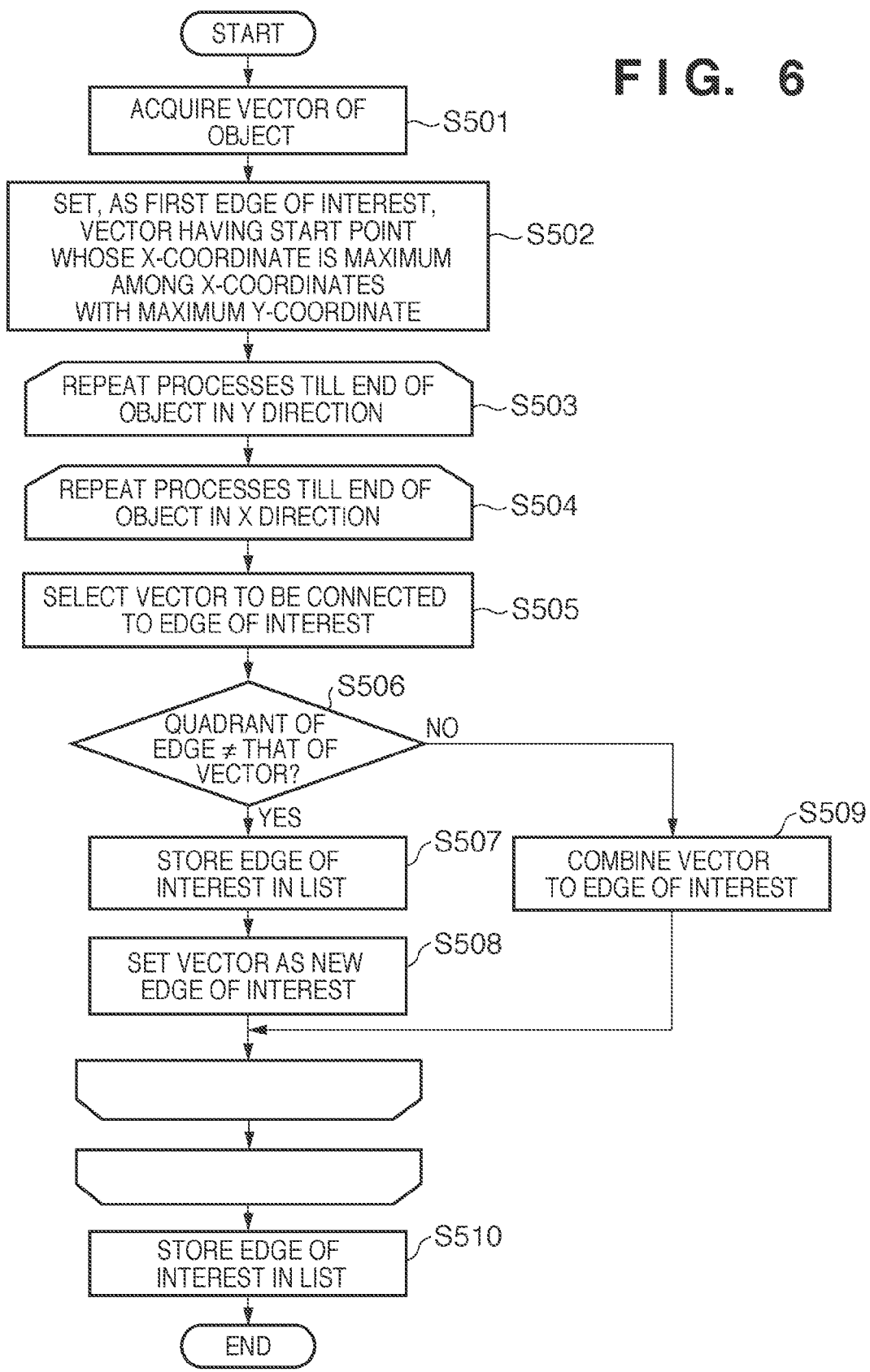

FIG. 7A

PRESENCE OF INFLECTION POINT

INFLECTION POINT (POINT OF CONTACT = INFLECTION POINT) (QUADRANT OF VECTOR DIRECTION CHANGES.) PORTION HAVING INFLECTION POINT IS OFTEN CHARACTERISTIC.

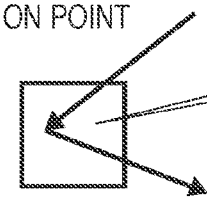
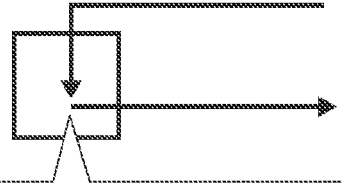

IF PORTION HAS INFLECTION POINT, IT IS DETERMINED THAT INFLUENCE OF THINNING THE PORTION IS GREAT, AND THE PORTION IS NOT THINNED OUT.

ESPECIALLY IMPORTANT 1-PIXEL THIN LINE CAN BE DETERMINED BASED ON PRESENCE/ABSENCE OF INFLECTION POINT.

ABSENCE OF INFLECTION POINT

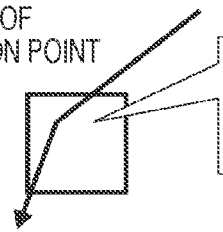

NO INFLECTION POINT (POINT OF CONTACT ≠ INFLECTION POINT) (QUADRANT DOES NOT CHANGE.) THINNING PORTION HAVING NO INFLECTION POINT HAS NO SIGNIFICANT EFFECT ON CONTOUR OF OBJECT.

IF PORTION DOES NOT HAVE INFLECTION POINT, IT IS DETERMINED THAT INFLUENCE OF THINNING THE PORTION IS LITTLE, AND THE PORTION IS SET AS LINE CANDIDATE TO BE THINNED OUT.

FIG. 7B

IT IS DETERMINED THAT INFLUENCE OF THINNING FOLLOWING PORTIONS IS GREAT, AND THESE PORTIONS ARE NOT THINNED OUT.

START POINT OF EDGE    END POINT OF EDGE    INTERSECTION POINT OF EDGE

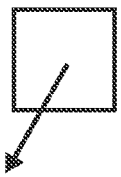
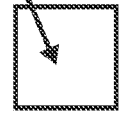

IT IS DETERMINED THAT INFLUENCE OF THINNING FOLLOWING PORTIONS IS LITTLE, AND THESE PORTIONS ARE SET AS LINE CANDIDATES TO BE THINNED OUT.

PORTION HAVING NONE OF START, END, AND INTERSECTION POINTS OF EDGE    NO EDGE

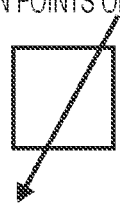
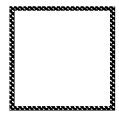

FIG. 9

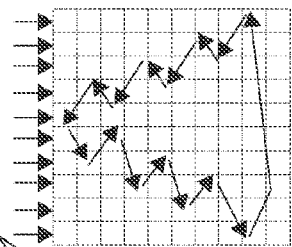

SAVED LINE =
LINE HAVING INFLECTION POINT

IF NUMBER OF LINES WHICH CAN BE THINNED OUT IS SHORT, SAVED LINES ARE

- THINNED OUT AT PREDETERMINED INTERVALS.
- THINNED OUT AT RANDOM NOT TO SUCCESSIVELY THIN LINES.
- NOT THINNED OUT
  (ONLY THIS OBJECT IS RENDERED AT ORIGINAL SIZE).

FOR FIGURE HAVING MANY INFLECTION POINTS, THERE IS NO "LINE WHICH CAN BE THINNED OUT."

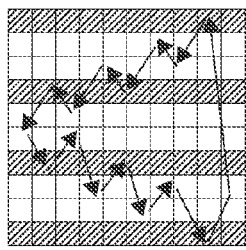

GRAY LINES ARE THINNED OUT.

(1) LINES ARE THINNED OUT
AT PREDETERMINED INTERVALS.

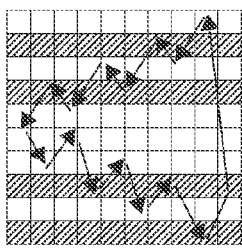

LINES ARE NOT SUCCESSIVELY THINNED OUT NOT TO GREATLY DEFORM CONTOUR.

(2) LINES ARE THINNED OUT AT RANDOM
NOT TO SUCCESSIVELY THIN LINES.

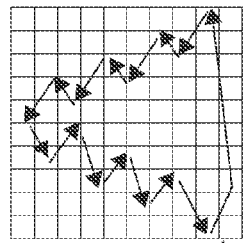

(3) NO LINE IS THINNED OUT
(ONLY THIS OBJECT IS RENDERED AT ORIGINAL SIZE).

WHEN NO LINE IS THINNED OUT, OBJECT MAY OVERLAP UPPER OR LOWER OBJECT, BUT MAINTAINS RENDERING SHAPE.

(4) NUMBER OF LINES TO BE
THINNED OUT IS DECREASED.

FOUR LINES NEED TO BE THINNED OUT FROM CALCULATION BASED ON REDUCTION RATIO, BUT NUMBER OF LINES WHICH CAN BE THINNED OUT IS SHORT, SO ONLY TWO LINES ARE THINNED OUT.

FIG. 14A

APPLICATION EXAMPLE:
SCANNER

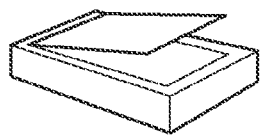

METHOD OF INVENTION IS APPLIED.

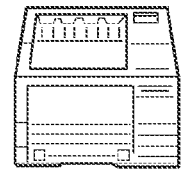

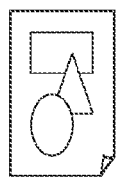 → 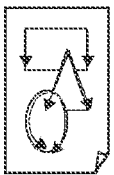 → 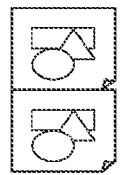 

SCANNED
BITMAP DATA

N-UP PRINTING

QUALITY DEGRADES
IF SCANNED BITMAP IMAGE IS
DIRECTLY REDUCED.

FIG. 14B

APPLICATION EXAMPLE:
STORAGE SYSTEM

OUTLINE DATA ARE EXTRACTED
FROM VARIOUS DATA IN PREVIEW,
AND METHOD OF INVENTION IS APPLIED.

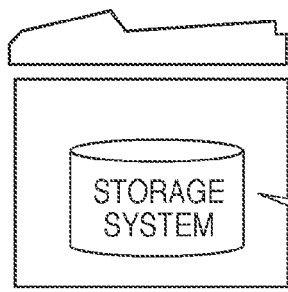

VARIOUS DATA STORED IN STORAGE
SYSTEM ARE DISPLAYED ON PREVIEW
SCREEN OF COPYING MACHINE.

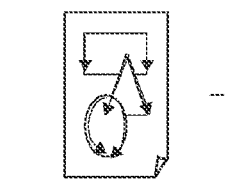 → 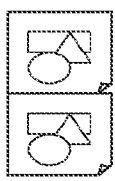 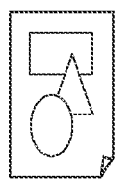

OUTLINE DATA       REDUCED            ADVANCED PREVIEW
                   THUMBNAIL DISPLAY   FOR ROTATION,
                                       OBLIQUE DISPLAY, ETC.

FIG. 15

CONVEX FIGURE

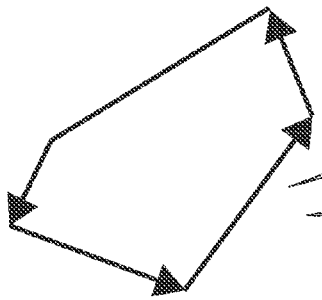

FOR CONVEX FIGURE, NUMBER OF PORTIONS WHICH READILY DISAPPEAR UPON REDUCTION IS SMALL, SO CONVEX FIGURE CAN BE REDUCED BY MULTIPLYING EDGE BY GENERAL TRANSFORM MATRIX WHOSE PROCESSING IS SIMPLE.

WHETHER OBJECT IS CONVEX FIGURE CAN BE DETERMINED BY DETERMINING WHETHER ALL EXTERIOR PRODUCTS OF ADJACENT EDGES HAVE SAME SIGN.

FOR FIGURE (CONCAVE FIGURE) OTHER THAN CONVEX FIGURE

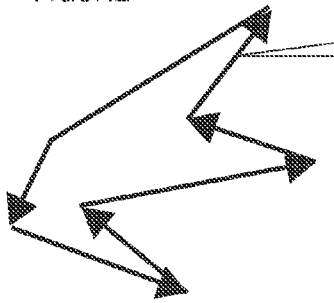

FOR CONCAVE FIGURE, NUMBER OF PORTIONS WHICH READILY DISAPPEAR UPON REDUCTION IS LARGE, AND REDUCTION METHOD OF INVENTION IS EFFECTIVE.

FIG. 16A
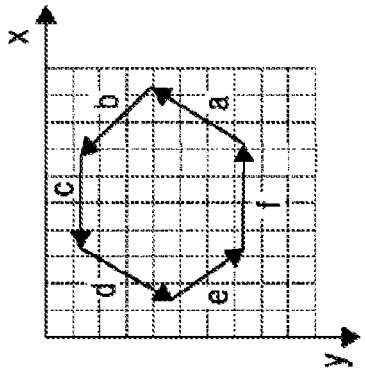
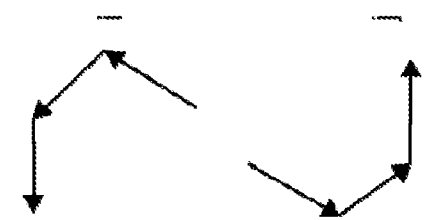
ALL EDGES WHEN THE EDGE IS DEFINED AS CONTINUOUS VECTOR UP TO INFLECTION POINT OF THE CONTOUR ALONG Y-AXIS.
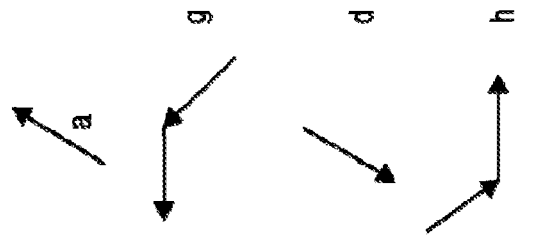
ALL EDGES WHEN THE EDGE IS DEFINED AS CONTINUOUS VECTOR UP TO INFLECTION POINT OF THE CONTOUR ALONG X- OR Y-AXIS.

FIG. 16B
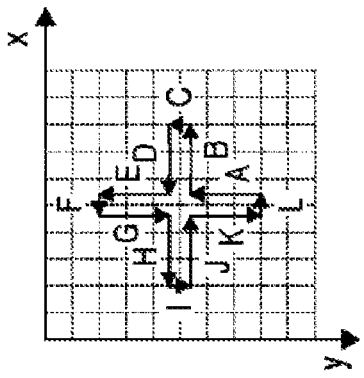
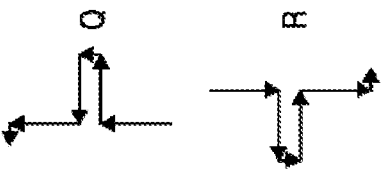
M N O P  ALL EDGES WHEN THE EDGE IS DEFINED AS CONTINUOUS VECTOR UP TO INFLECTION POINT OF THE CONTOUR ALONG X- OR Y-AXIS.
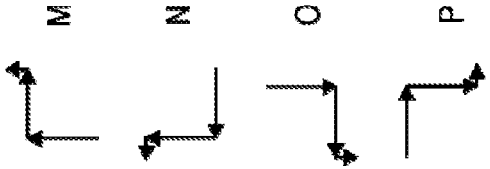
Q R  ALL EDGES WHEN THE EDGE IS DEFINED AS CONTINUOUS VECTOR UP TO INFLECTION POINT OF THE CONTOUR ALONG Y-AXIS.

IMAGE PROCESSING APPARATUS, CONTROL METHOD AND COMPUTER-READABLE MEDIUM STORING A PROGRAM

BACKGROUND OF THE INVENTION

1. Field of the Invention

The present invention relates to an image processing apparatus, control method, and a computer-readable medium storing a program. Particularly, the present invention relates to image reduction processing.

2. Description of the Related Art

Recently, efforts are being made to decrease the print count by using N-up printing and the like for resource saving. However, when rendering data is reduced in N-up printing, thin horizontal lines may disappear as shown in FIG. 1A. Various methods have been proposed to thin out bitmap data for reduction, but suffer poor quality (BLACKONWHITE (for binary data), WHITEONBLACK (for binary data), COLORONCOLOR (for multilevel data), and HALFTONE (for multilevel data)). These methods have many restrictions such that their main targets are binary data, and smoothing must be applied simultaneously for multilevel data. For example, text bitmap data is created in accordance with the resolution without considering reduction, so shape is lost upon reduction. There is an effective means for binary data which reflects information by ORing data at the two ends of a line to be thinned out. However, this is not effective for multilevel data because ORing different colors makes the color unclear. A reduction method effective for binary and multilevel data is to reduce vector data of the outline of rendering data. In this method, vector data is reduced by transform processing of multiplying it by a transform matrix. There is also proposed a method of determining the thinning order by paying attention to horizontal and vertical line elements (see Japanese Patent Laid-Open No. 4-93892).

However, simple transform processing reduces a 1-pixel wide horizontal line or the like to have a line width of smaller than 1 pixel, and such a thin line may not be rendered after quantization (FIG. 1B). Also, a line slightly inclined from a horizontal or vertical line, italicized text, and the like cannot be appropriately processed using the method of determining the thinning order by paying attention to horizontal and vertical line elements, like Japanese Patent Laid-Open No. 4-93892.

SUMMARY OF THE INVENTION

According to one aspect of the present invention, there is provided an image processing apparatus which performs reduction processing for rendering data in accordance with a reduction ratio, the apparatus comprising: edge extraction unit that extracts edges from a contour of an object in the rendering data; saved line specification unit that specifies, out of lines including the edges extracted by the edge extraction unit, lines each having an outer shape feature of the object as saved lines which are lines not subjected to thinning processing; and thinning processing unit that thins out lines other than the saved lines in the object, thereby performing the reduction processing for the rendering data, wherein the saved line specification unit specifies saved lines by determining the outer shape feature of the object in accordance with characteristics of the edges.

According to another aspect of the present invention, there is provided a method of controlling an image processing apparatus which performs reduction processing for rendering data in accordance with a reduction ratio, the method comprising: an edge extraction step of causing edge extraction unit of the image processing apparatus to extract edges from a contour of an object in the rendering data; a saved line specification step of causing saved line specification unit of the image processing apparatus to specify, out of lines including the edges extracted in the edge extraction step, lines each having an outer shape feature of the object as saved lines which are lines not subjected to thinning processing; and a thinning processing step of causing thinning processing unit of the image processing apparatus to thin out lines other than the saved lines in the object, thereby performing the reduction processing for the rendering data, wherein in the saved line specification step, saved lines are specified by determining the outer shape feature of the object in accordance with characteristics of the edges.

According to another aspect of the present invention, there is provided a computer-readable medium storing a program causing a computer to function as edge extraction unit that extracts edges from a contour of an object in rendering data, saved line specification unit that specifies, out of lines including the edges extracted by the edge extraction unit, lines each having an outer shape feature of the object as saved lines which are lines not subjected to thinning processing, and thinning processing unit that thins out lines other than the saved lines in the object, thereby performing reduction processing for the rendering data, wherein the edge extraction unit extracts portions serving as the edges using vectors of the contour of the object, and the saved line specification unit specifies saved lines by determining the outer shape feature of the object in accordance with characteristics of the edges.

According to the present invention, a rendering object can be reduced without degradation of the quality such as omission of a line for a 1-pixel wide horizontal, vertical, or thin line. A line to be processed is not determined based on whether it is a horizontal or vertical line. Hence, even a line slightly inclined from a horizontal or vertical line, italicized text, and the like can be appropriately reduced. Not only binary data but also multilevel data can be reduced with high quality.

Further features of the present invention will become apparent from the following description of exemplary embodiments (with reference to the attached drawings).

BRIEF DESCRIPTION OF THE DRAWINGS

FIG. 6 is a flowchart showing edge extraction processing according to the embodiment;

FIGS. 7A and 7B are views exemplifying specification of a "saved line" according to the embodiment;

FIG. 9 is a view showing a thinning method according to the embodiment;

FIGS. 14A and 14B are views showing application examples of processing according to the embodiment; and FIG. 15 is a view exemplifying a cutting criterion in the reduction processing method according to the embodiment.

FIG. 16A and 16B are views exemplifying extracted edges according to the embodiment.

DESCRIPTION OF THE EMBODIMENTS

Embodiments of the present invention will be described below with reference to the accompanying drawings. In the following embodiments, a rendering object reduction method according to the present invention is applied especially to a printer driver in an image processing system. However, the rendering object reduction method is also similarly implemented by executing it not by the printer driver but in a printing apparatus. Further, the rendering object reduction method is similarly implemented by executing it using a display device or an application which performs image processing.

First Embodiment

Figure 1A:
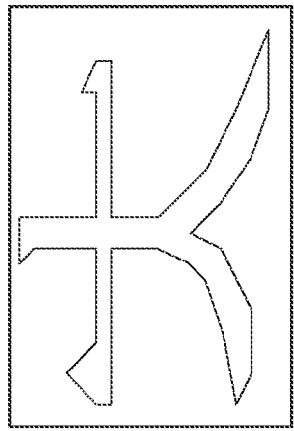
FIGS. 1A and 1B are views for explaining a problem to be solved by the present invention.
Figure 1B:
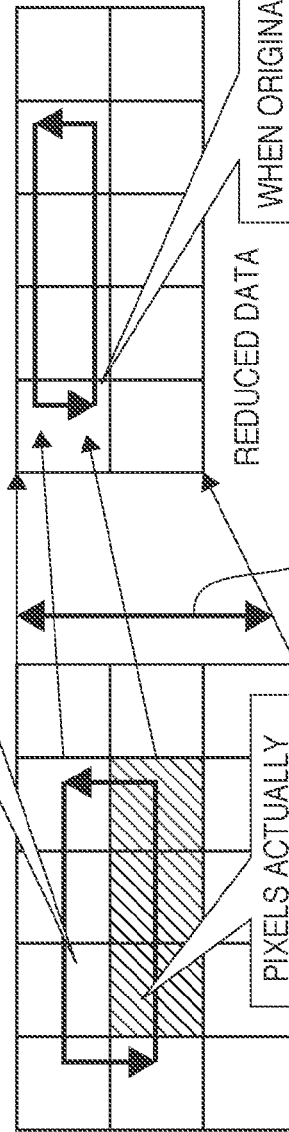
Figure 2A:
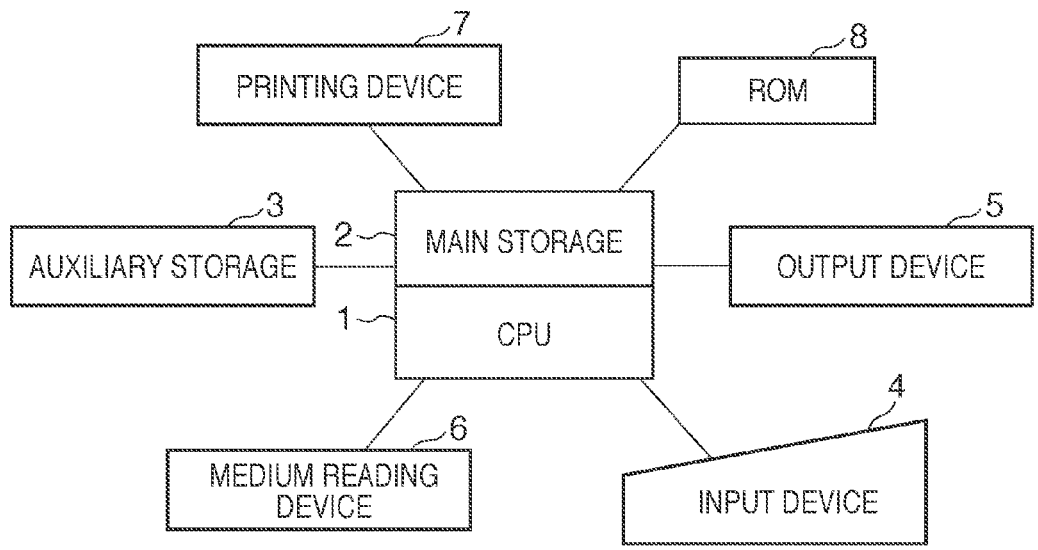
FIGS. 2A and 2B are block diagrams exemplifying the configuration of an image processing system according to an embodiment.

FIG. 2A is a block diagram exemplifying the configuration of an image processing system to which the rendering object reduction method is applied. In FIG. 2A, a CPU (Central Processing Unit) 1 loads a program and related data from a storage medium such as an FD, CD-ROM, or IC memory card via a medium reading device 6 connected to the system. Then, the CPU 1 processes information input from an input device 4 in accordance with a system program or application program loaded from an auxiliary storage 3 into a main storage 2, and outputs the processed information to an output device 5 or printing device 7. In the embodiment, the output device 5 is a display device, and is discriminated from the printing device 7 which is classified into the output device 5 by nature. The input device 4 includes a keyboard and pointing device. The auxiliary storage 3 may be formed from a hard disk, a magneto-optical disk, or a combination of them. These devices may be connected via a network, which does not limit the scope of the present invention.

Figure 2B:
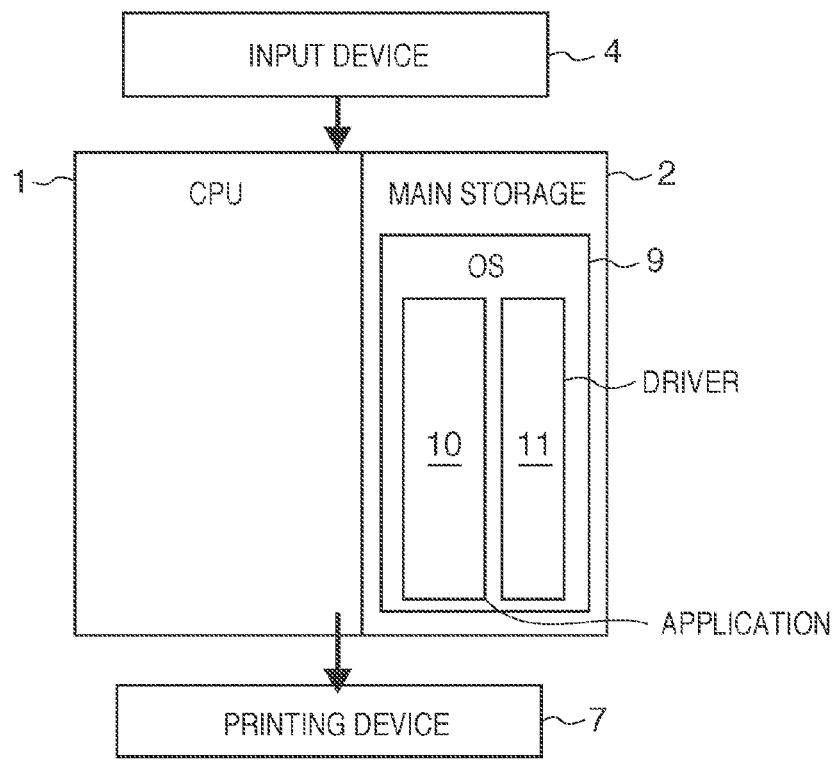

FIG. 2B is a conceptual view showing a sequence of loading an image processing method control program and related data from a storage into the CPU 1, inputting a print instruction from the input device 4, and sending data to the printing device 7 to print. This sequence is executed under the control of an application 10, driver 11, and OS 9.

Figure 3:
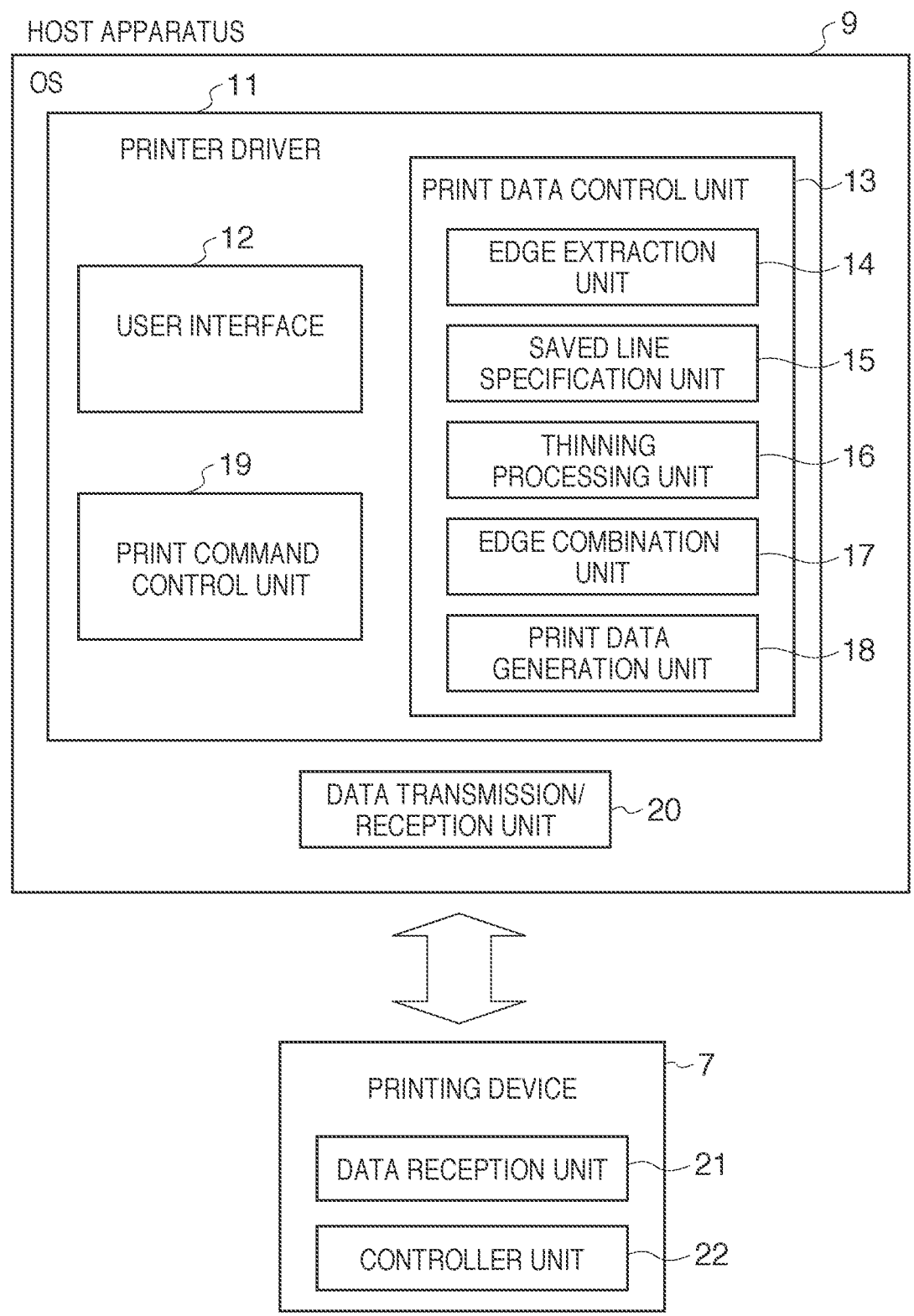
FIG. 3 is a block diagram showing the configuration of the overall image processing system according to the embodiment.

FIG. 3 is a block diagram showing an arrangement according to the present invention. The OS 9 shown in FIG. 3 controls an information processing apparatus (host apparatus) in the image processing system of the present invention (to be described later). Note that the host apparatus is connected to the printing device 7 (to be described later) via a Centronics interface. The driver 11 is a printer driver (application software) which resides on the OS 9 and controls the printing device 7. A user interface 12 allows the user to input various kinds of print settings and the like to the printing device 7 or designate the start of printing. A print data control unit 13 accepts a rendering instruction from the application 10 and creates data processible by the printing device 7. The print data control unit 13 includes important processing units on the host apparatus side in the image processing system of the present invention.

An edge extraction unit 14 extracts an edge from the contour of an object. A saved line specification unit 15 determines whether the line of interest should not be thinned out, and specifies a line which should not be thinned out. Note that a line which should not be thinned out will be called a "saved line" for descriptive convenience. A thinning processing unit 16 thins out, at a reduction ratio, lines other than saved lines specified by the saved line specification unit 15. An edge combination unit 17 combines edges divided upon thinning by the thinning processing unit 16. A print data generation unit 18 performs rendering to create print data such as bitmap data or PDL data. A print command control unit 19 converts print data created by the print data generation unit 18 into a print command corresponding to the printing device 7. The print command control unit 19 also controls all print commands. A data transmission/reception unit 20 is one of functions provided by the OS. The data transmission/reception unit 20 transmits/receives data to/from the printing device 7 via the Centronics interface. The printing device 7 performs print processing and the like in accordance with an instruction from the connected host apparatus.

Figure 4:
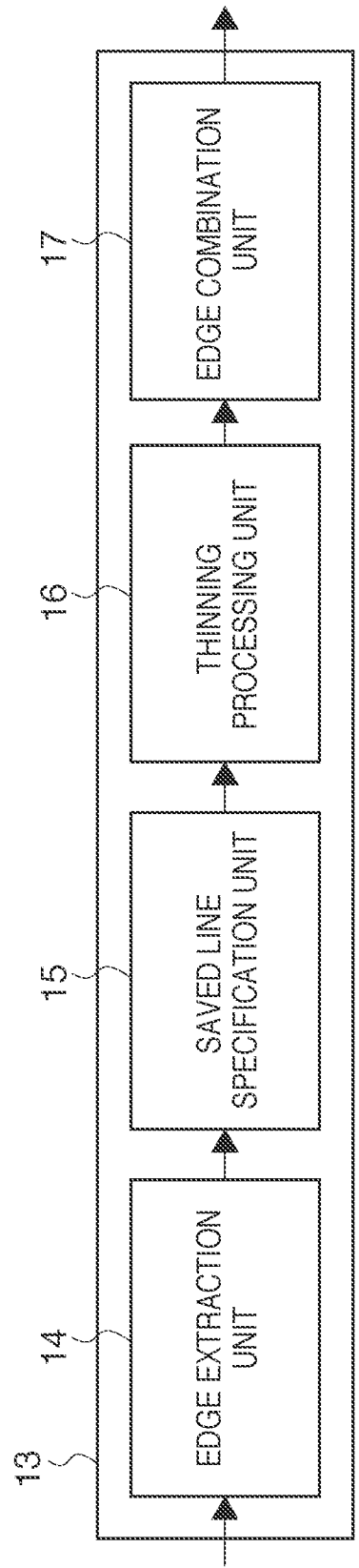
FIG. 4 is a block diagram showing the image processing system according to the embodiment.
Figure 5A:
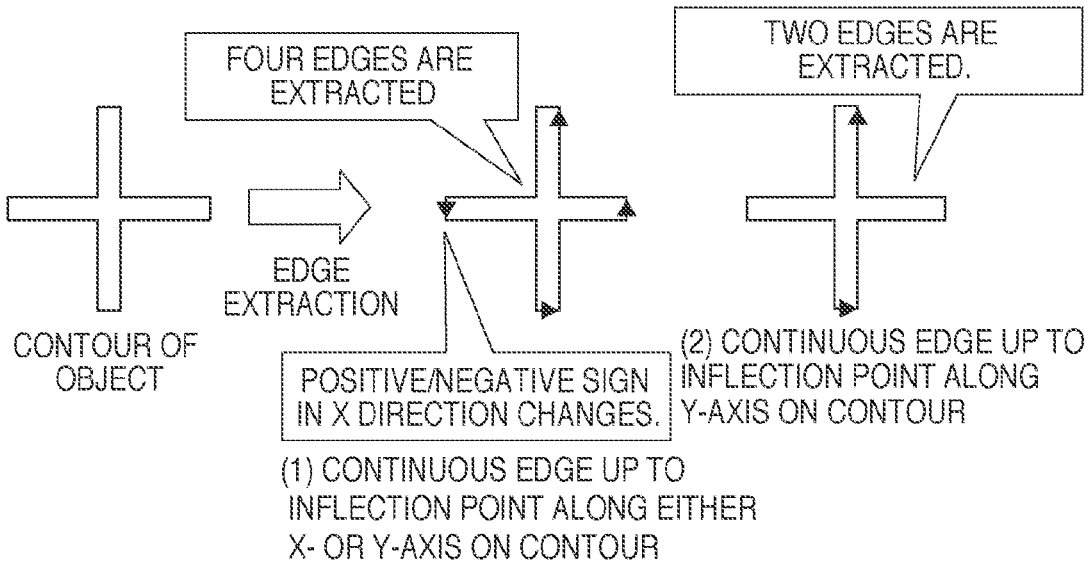
FIGS. 5A and 5B are views showing edge extraction according to the embodiment.

FIG. 4 is a block diagram of processing by the image processing system in the embodiment. The edge extraction unit 14 extracts an edge from the contour of each object of rendering data. In the edge extraction method, a continuous vector up to an inflection point of the contour or a continuous vector up to an inflection point of the contour along the Y-axis is extracted as an edge, as shown in FIG. 5A. The inflection point is a point at which the positive/negative sign changes along the X- or Y-axis.

[Edge Extraction]

A method of extracting, as an edge, a continuous vector up to an inflection point of the contour will be explained with reference to FIG. 16A and the flowchart of FIG. 6. In FIG. 16A, hexagonal object is exemplified. Processing in FIG. 6 is that of a printer driver program. In S501, the circumscribed vector (to be referred to as a vector) of the contour of an object to be reduced is acquired. The object shown in FIG. 16A is composed by six vectors (vector a~f). In S502, a vector having an upper right start point (maximum X-coordinate among X-coordinates with a maximum Y-coordinate) is defined as the first edge of interest. In the case of the object shown in FIG. 16A, the edge of interest is vector a. Subsequently, processes in S505 to S508 are repeated for all the vectors of the object (S503 and S504). In S505, another vector which is connected to the end point of the edge of interest is selected. In the case of the object shown in FIG. 16A, vector b that connected to the end point of vector a as the edge of interest is selected. A point at which the edge of interest and the selected vector are connected is defined as a point of contact. In the case of the object shown in FIG. 16A, a point that vector a and vector b are connected is the point of contract. In S506, the quadrant of the edge of interest is compared with that of the vector selected in S505. In this case, there are four quadrants in positive and negative directions along the X- and Y-axes. The first quadrant is the range of X>0 and Y>0, the second quadrant is the range of X<0 and Y>0, the third quadrant is the range of X<0 and Y<0, and the fourth quadrant is the range of X>0 and Y<0. Each vector belongs to one of the four quadrants. Horizontal vector and vertical vector have different qualities. Horizontal vector in positive direction along the X-axis belongs to the first quadrant or the fourth quadrant. Horizontal vector in negative direction along the X-axis belongs to the second quadrant or the third quadrant. Vertical vector in positive direction along the Y-axis belongs to the first quadrant or the second quadrant. Vertical vector in negative direction along the Y-axis belongs to the third quadrant or the fourth quadrant.

If the quadrants of the edge of interest and selected vector differ from each other as a result of comparison in S506, the point of contact between the edge of interest and the selected vector serves as an inflection point, and the edge of interest is stored in a list in S507. In S508, the selected vector is set as a new edge of interest. In FIG. 16A, the point of contact between vector a and vector b serves as an inflection point, because vector a belongs to the fourth quadrant and vector b belongs to the third quadrant. Next, vector b is selected as new edge of interest. If it is determined in S506 that the quadrants of the edge of interest and selected vector are the same, the edge of interest and selected vector are combined to each other in S509. In FIG. 16A, vector connecting vector b and vector c is treated as the edge (vector g in shown FIG. 16A). Next, vector d that is connected to the edge of interest is selected as new edge of interest. Vector d belongs to the second quadrant, and the quadrant of vector d is different from the quadrant of vector g. Thus, the point of contact between vector g and vector d serves as the inflection point. And, vector g is stored in the list as the edge. Next, vector d is selected as new edge of interest. After applying these processes to all vectors, the final vector is stored as an edge in the list in S510. Note that the list stores all edges extracted from acquired vectors. For object shown in FIG. 16A, vector a, g, d, h are stored in the list as the edge. When a vector up to an inflection point of the contour along the Y-axis is set as a continuous one, it is determined in S506 "whether the positive/negative sign along the Y-axis changes between the edge of interest and a selected vector." For object shown in FIG. 16A, vector i, j are stored in the list as edge.

It is described reference to FIG. 16B for horizontal vector and vertical vector. A cross object structured by horizontal lines and vertical lines are shown in FIG. 16B. This object includes twelve vectors (vector A~L) as circumscribed vector. First, vector A is selected first edge of interest. Vector A belongs to the third quadrant or the fourth quadrant, because vector A is vertical vector in negative direction along the Y-axis. Vector B that connected to end point of the vector A served as the edge of interest is selected. Vector B belongs to the first quadrant or the fourth quadrant, because vector B is horizontal vector in positive direction along X-axis. In this case, it is determined that the point of contact between vector A and vector B belongs to the fourth quadrant. Thus, vector A is connected to vector B. The connected edge of interest belongs to the fourth quadrant. Next, vector C is selected. Vector C is vertical vector in negative direction along the Y-axis, and belongs to the fourth quadrant. Thus, vector C is also connected to the edge of interest. Next, vector D is selected. Vector D is horizontal vector in negative direction along the X-axis, and belongs to the second quadrant or the third quadrant. In this case, the quadrant of vector D is different from the quadrant of the edge of interest. Thus, the point of contact between the edge of interest and vector D serves as the inflection point. And, vector M that is vector A connected to vector B and C is stored in the list as the edge. Next, vector D is served as the new edge of interest. Similar processing is repeated. As a result, in case of object shown in FIG. 16B, vector M, N, O, and P are stored in the list as the edge. As well, in the case of the continuous vector up to an inflection point of the contour along the Y-axis is extracted as the edge, vector Q and R are stored in the list as the edge.

[Specification of Saved Line]

Figure 5B:
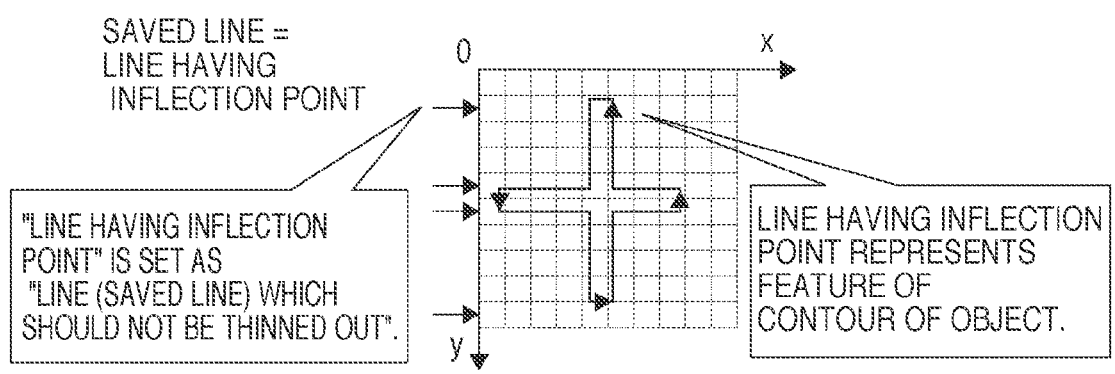

The saved line specification unit 15 specifies, as a saved line, a "line which should not be thinned out" that indicates the feature of the contour of an object. The feature of the contour is, for example, the relationship (connection) between edges, and the positional relationship in the object. For example, when reducing an object along the Y-axis, as shown in FIG. 5B, a line having an inflection point is regarded as a "saved line". In this example, it is determined that a line including an inflection point indicates the feature of the contour of an object. In the object shown in FIG. 5B, saved lines are lines indicated by arrows (lines 2, 5, 6, and 10 along the Y-axis). However, saved lines are not limited to them, and a line having the start point, end point, or intersection point of an edge may be set as a saved line. Examples of a determination criterion based on the outer shape feature of an object when specifying a saved line will be explained with reference to FIGS. 7A and 7B. FIG. 7A shows an example in which the determination criterion is the presence/absence of an inflection point. FIG. 7B shows an example in which the determination criterion is the presence/absence of a start point, end point, or intersection point.

According to the determination criterion in FIG. 7A, a point at which the quadrant of the vector direction changes is defined as an inflection point, that is, the point of contact between vectors is an inflection point. Since a portion including an inflection point often represents the feature of an object, it can be determined that a portion (line) including an inflection point is a portion not to be thinned out. In contrast, a point at which the quadrant of the vector direction does not change is not set as an inflection point, that is, the point of contact is not an inflection point.

According to the determination criterion in FIG. 7B, determination is made based on the presence/absence of the start point, end point, or intersection point of an edge. The start point, end point, or intersection point of an edge frequently represents the feature of an object, so it can be determined that a portion including a start point, end point, or intersection point is a portion not to be thinned out, similar to one including an inflection point. A portion at which an edge only passes, or a portion including no edge can be set as a thinning candidate.

In this way, a portion to be set as a saved line can be specified using the outer shape feature of the contour of an object as a determination criterion.

[Thinning Processing/Combination Processing]

The thinning processing unit 16 thins out N lines for every M lines in accordance with the reduction ratio from lines other than saved lines which are specified by the saved line specification unit 15. For example, when reducing an object to 66% (⅔), lines are thinned out at a ratio of one line to three lines such that one line is thinned out for every three lines, two lines are thinned out for every six lines, or three lines are thinned out for every nine lines. The edge combination unit 17 combines edges which are divided as a result of thinning out lines by the thinning processing unit 16.

Figure 8:
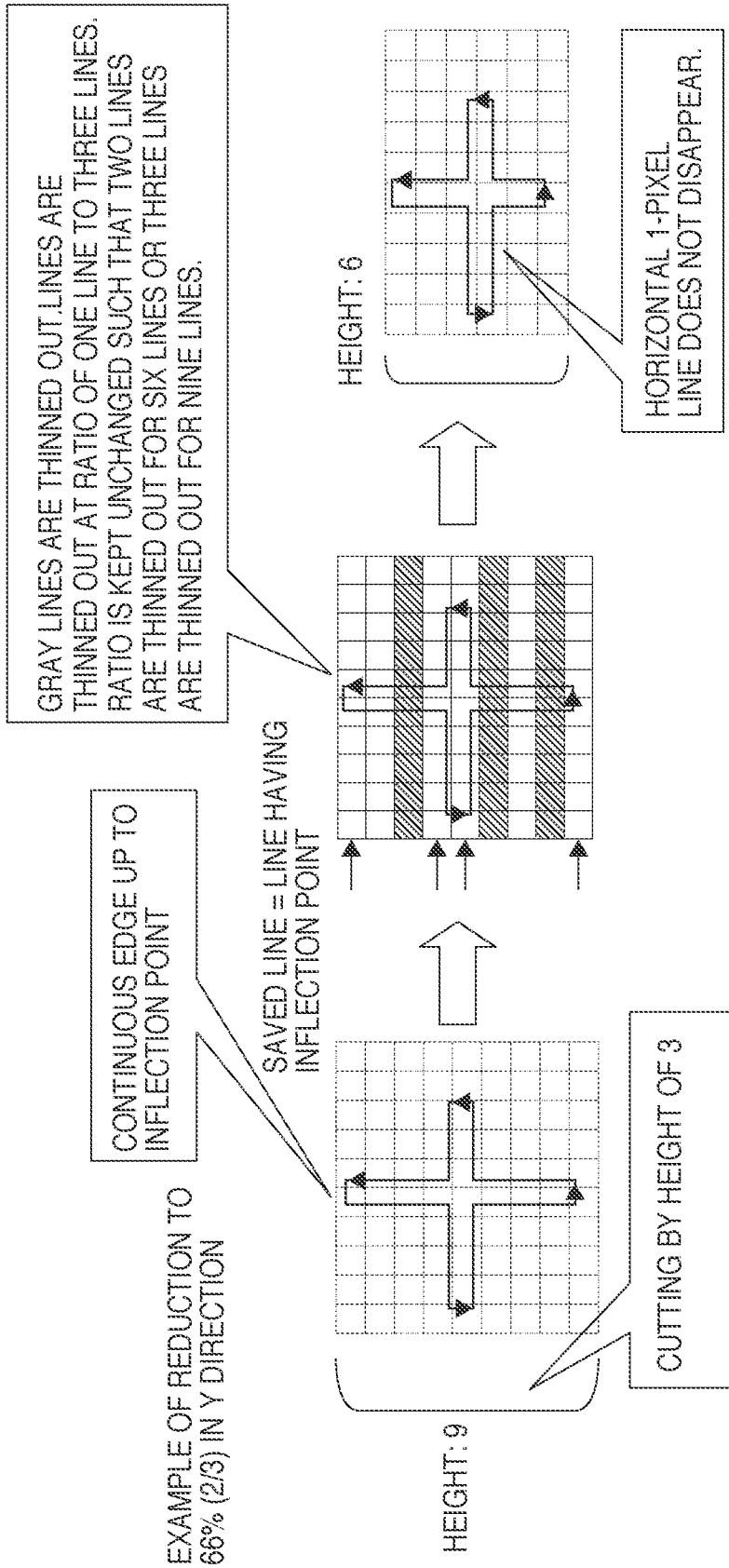
FIG. 8 is a view exemplifying reduction of an image according to the embodiment.

FIG. 8 exemplifies reduction of an object to 66% (⅔) along the Y-axis. In this example, the object has a height of nine lines, and three lines are thinned out. Three lines (gray lines) are selected from lines other than saved lines (lines indicated by arrows), and thinned out. Then, edges divided as a result of thinning out lines being combined. Even upon reduction along the Y-axis, an important horizontal 1-pixel line does not disappear. Note that a line to be thinned out may be the first or final line out of M lines, or may be selected at random from lines other than saved lines.

In some cases, there are many saved lines, and the number of lines which can be thinned out becomes short. A processing method in such a case will be explained with reference to FIG. 9. The processing of the embodiment becomes applicable by, for example, "thinning out lines at predetermined intervals", "thinning out lines at random so as not to successively thin out lines", "thinning out no line (leaving only the object unchanged from the original size)", or "decreasing the number of lines to be thinned out." In the method of "thinning out lines at random so as not to successively thin out lines", lines are not successively thinned out not to greatly deform the contour. In the method of "thinning out no line (leaving only the object unchanged from the original size)", the object may overlap an upper or lower object, but maintains the rendering shape. This method is very effective for a complicated small-size character or the like. For example, when reducing a 9-line object into a 6-line one, the object is rendered without thinning out any of the nine lines. This is case that the interval between the target object and an upper or lower one is three or more lines. In the case, three lines that are the interval between the target object and an upper or lower one are thinned out. In the method of "decreasing the number of lines to be thinned out", if a line can be thinned out, it is thinned out, and if no line can be thinned out, no line is thinned out. Alternatively, when no line can be thinned out but four lines need to be thinned out, reduction processing is done to thin out only half the necessary lines, that is, two lines. In the method of "thinning out no line (leaving only the object unchanged from the original size)" and the method of "decreasing the number of lines to be thinned out", the object is not reduced at an expected reduction ratio, but maintains its contour to a certain degree. Note that the four methods have been exemplified, but the present invention is not limited to them and may adopt another method. The method to be applied may be changed in accordance with the characteristics of an object to be reduced.

Figure 10:
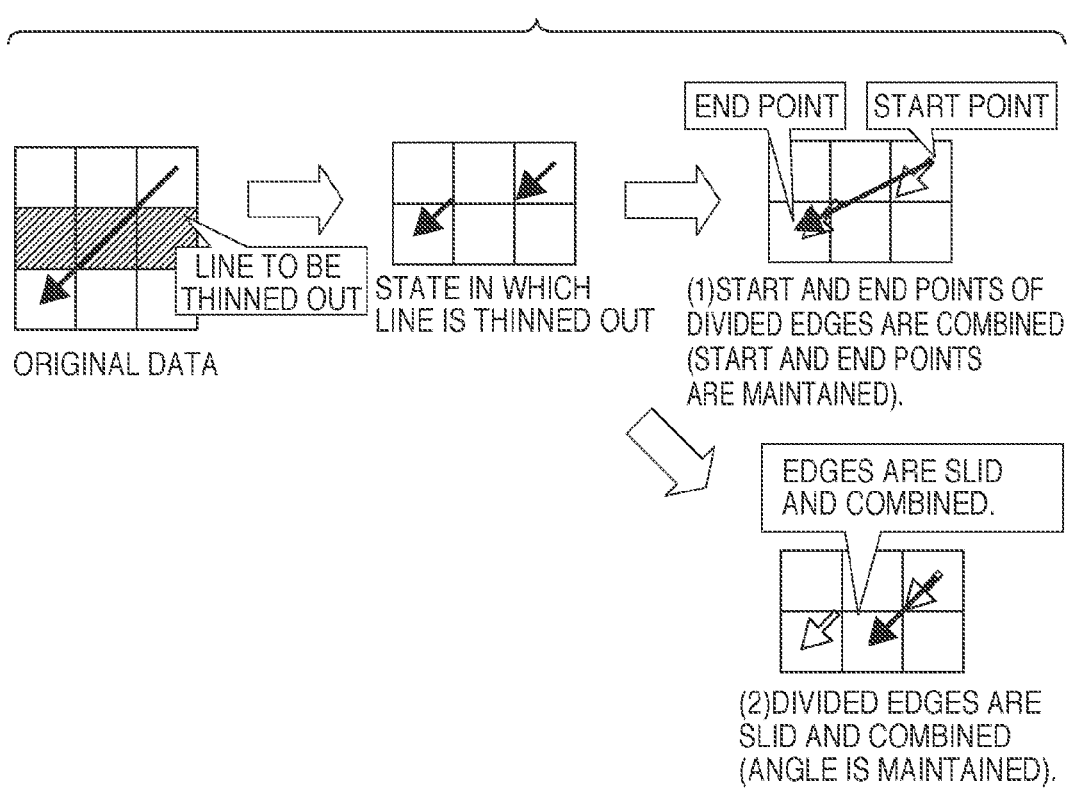
FIG. 10 is a view showing an edge combination method after thinning according to the embodiment.

When an edge is divided upon thinning out lines, the divided edges need to be combined to reconstruct the original edge. As an edge combination method, for example, the "start and end points of divided edges are combined", or "edges are slid and combined", as shown in FIG. 10. In the method of "combining the start and end points of divided edges", the start point of an edge on the start point side of an edge before division, out of divided edges, is combined to the end point of the other divided edge, thereby generating a new edge. This method has an advantage that the positional relationship between the start and end points of an edge before applying reduction processing is maintained. In the method of "sliding and combining edges", either or both of an edge on the start point side of an edge before division, out of divided edges, and the other divided edge are slid and moved in a direction in which they come close to each other. Then, the end point of the edge on the start point side of the original edge is combined to the start point of the other edge, thereby generating a new edge. This method has an advantage that angle of the edge is maintained. Note that the two combination methods for divided edges have been exemplified, but the present invention is not limited to them and may employ another method. The method to be applied may be changed in accordance with the characteristics of an object subjected to combination processing.

[Reduction Processing Sequence]

Figure 11:
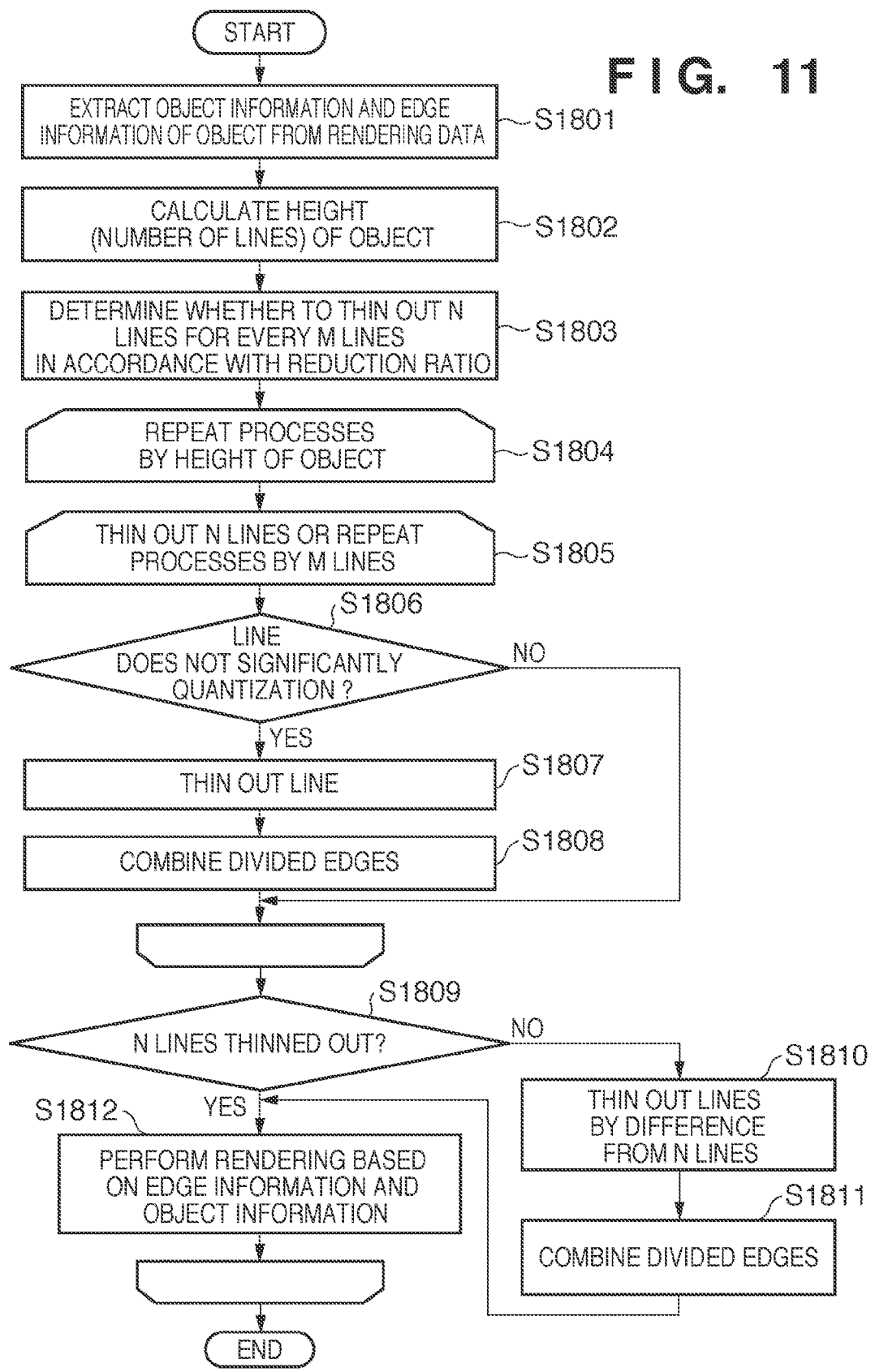
FIG. 11 is a flowchart showing reduction processing for each object according to the embodiment.

The image processing method of reducing a rendering object is executed in accordance with a printer program based on a flowchart shown in FIG. 11. The image processing method according to the embodiment will be explained with reference to the flowchart of FIG. 11.

In FIG. 2A, when the user inputs an instruction via the input device 4 to execute printing, the OS 9 which has been loaded from the auxiliary storage 3 onto the main storage 2 receives this message. The OS 9 sends the print execution message to the application 10 which is active now. The application 10 converts the received message into a command recognizable by the OS 9, and sends print data and the command message to the OS 9. The OS 9 converts the received information into a command recognizable by the driver 11, and sends the message to the driver 11. Upon receiving an initialization message, the driver 11 determines various settings based on settings on the user interface 12 of the driver 11 or default values.

In S1801, the driver 11 extracts object information such as the edge, color, and overlapping information of a rendering object. Note that object information to be extracted is not limited to the above-mentioned ones, and may include another information held by the object. In S1802, the height (number of lines) of the object is calculated. In S1803, it is determined in accordance with a designated reduction ratio whether to thin out N lines for every M lines. In S1804, processes in S1805 to S1811 are repeated by the height (number of lines) of the object. In S1805, processes in S1806 to S1808 are repeated until the number of thinned lines reaches that of lines to be thinned out (N lines for every M lines) that has been determined in S1803 in accordance with the reduction ratio, or the processes are repeated for M lines serving as a processing unit. In S1806, it is determined whether the line of interest is a line on which quantization does not significantly affect the image quality (i.e., line other than a saved line). As the determination criterion, one of the methods described with reference to FIGS. 7A and 7B is adopted. If it is determined in S1806 that quantization has no significant effect on the image quality, the line of interest is thinned out in S1807. In S1808, the edges of the object that have been divided by thinning processing are combined, holding the combined edge. If it is determined in S1806 that quantization greatly affects the image quality, the line of interest is changed to the next line, and the above processes are repeated. Note that the process in S1808 may be executed every time the object line of interest is processed, or after applying the processes for all lines. In the latter case, the process in S1808 is executed before S1809.

In S1809, it is determined whether lines to be thinned out (N lines for every M lines) in accordance with the reduction ratio have not been thinned out from the object of interest in the thinning processing (S1805 to S1808) due to the determination result in S1806. That is, it is determined whether the number of lines (number of lines other than saved lines) on which the influence of quantization is little is smaller than the number (N) of lines to be thinned out. If lines have been thinned out by the number corresponding to the reduction ratio, the process advances to S1812. If lines have not been thinned out by the number corresponding to the reduction ratio, lines are thinned out in S1810 by a difference from the number of lines which have already been thinned out. As the method of additionally thinning out lines, saved lines may be thinned out without fail until the number of thinned lines reaches that of lines to be thinned out, or lines may be thinned out using one of the methods described with reference to FIG. 9. The method may be changed in accordance with the characteristics of an object. In S1811, edges upon thinning are combined, holding the combined edge. As the combination method, the method described with reference to FIG. 10 is adopted. In S1812, rendering is done based on the generated information such as edges, and object information. These processes are repeated by the entire height (numbers of lines) of the object. After that, this sequence ends.

Figure 12:
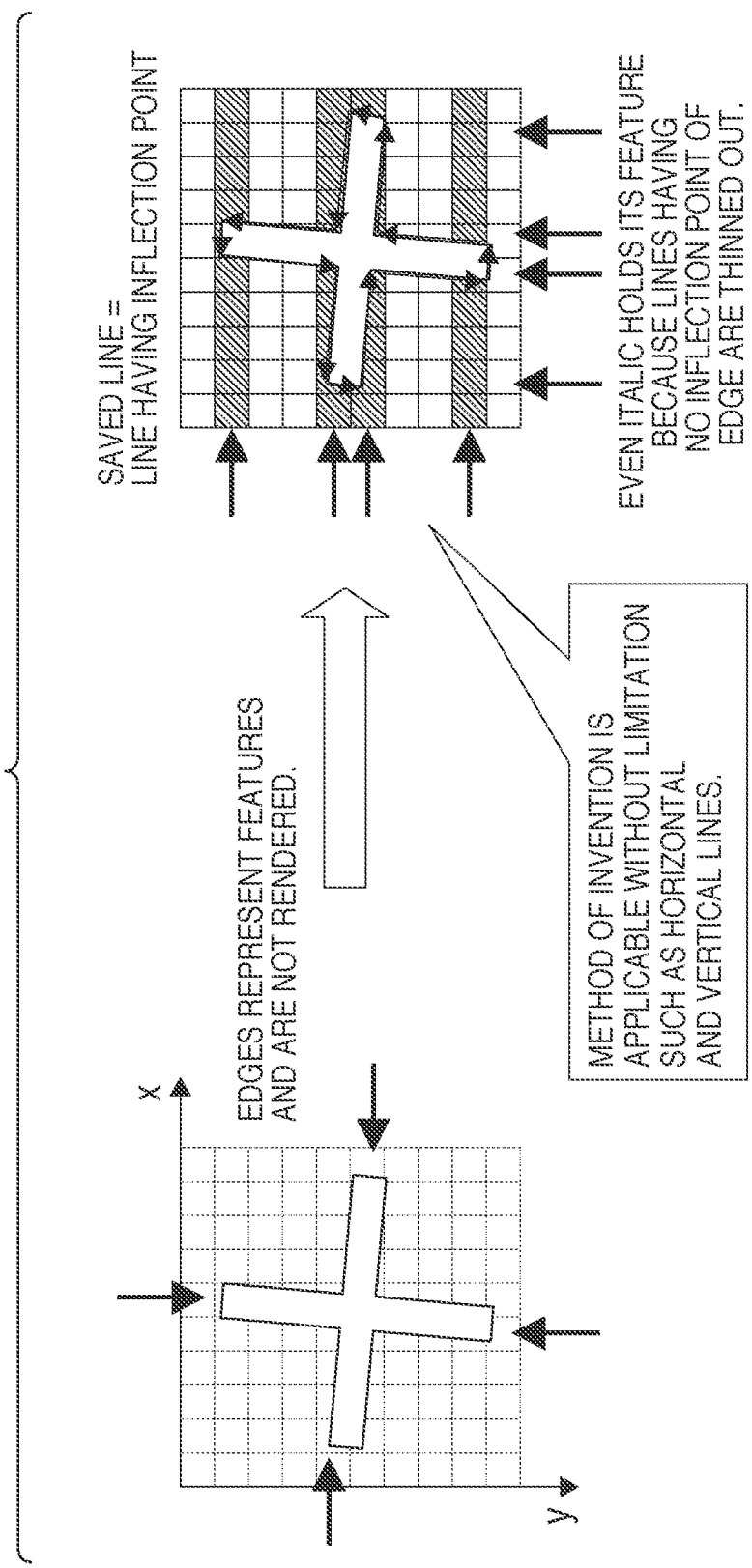
FIG. 12 is a view showing processing for lines slightly inclined from horizontal and vertical lines according to the embodiment.

In the present invention, reduction processing is achieved by thinning which pays attention to the feature points (e.g., inflection points) of edges. The present invention can solve the problem that attention is paid to horizontal and vertical components and italicized text or a line slightly inclined from a horizontal or vertical line is thinned out, as shown in FIG. 12. In addition, the present invention does not require cumbersome processing such as determination of a closed section or the like.

In the above-described manner, a rendering object can be reduced without degradation of the quality such as omission of a line for a 1-pixel wide horizontal, vertical, or thin line. A line to be processed is not determined based on whether it is a horizontal or vertical line. Thus, even a line slightly inclined from a horizontal or vertical line, italicized text, and the like can be appropriately reduced. Not only binary data but also multilevel data can be reduced with high quality.

Second Embodiment

Figure 13:
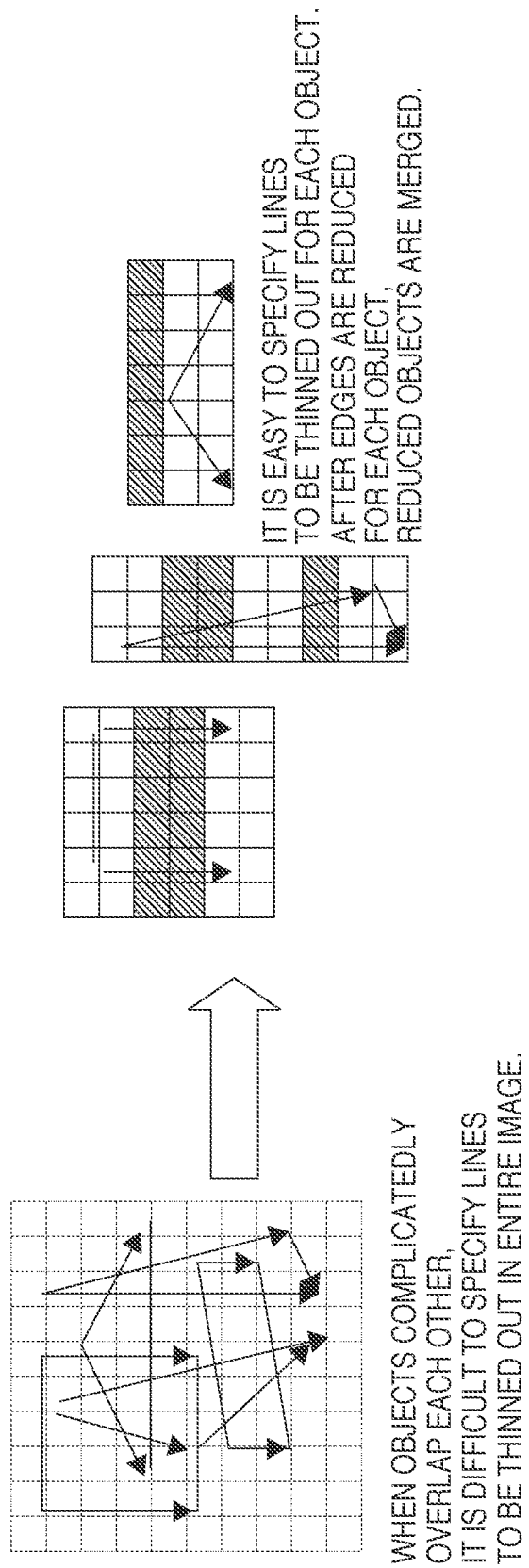
FIG. 13 is a view showing a case in which objects of an image are processed one by one according to another embodiment.

The first embodiment assumes a case in which a plurality of objects do not overlap each other in image data. As described in the first embodiment, the edge extraction unit 14 processes each object of rendering data. However, even rendering data (object) containing a plurality of objects can also be processed. The second embodiment will describe a processing method which assumes a case in which objects complicatedly overlap each other, as shown in FIG. 13. When a plurality of objects complicatedly overlap each other, as shown in FIG. 13, it is difficult to specify lines to be thinned out from objects in the entire image. However, lines to be thinned out can be easily extracted by processing objects one by one. That is, edges are reduced for each object, and then the reduced objects are merged. Most parts of the second embodiment are the same as those of the first embodiment, and only a difference will be described.

In the second embodiment, before executing edge extraction processing shown in FIG. 6, a plurality of objects in rendering data are extracted. Then, edge extraction in FIG. 6 is applied to each object. In S1801 of subsequent reduction processing described with reference to FIG. 11, information of each object is acquired in S1801. The processing in FIG. 11 is then applied to all the objects. In S1812, all the objects are rendered to merge and output the extracted objects.

In addition to the effects described in the first embodiment, the processing of the second embodiment is applicable to even a complicated image when one rendering data contains a plurality of objects.

[Application Examples]

Application examples of the present invention will be described. The following application examples are merely examples, and the present invention is not limited to them. As shown in FIG. 14A, directly reducing bitmap data scanned by a scanner for N-up printing or the like degrades the quality. To prevent this, outline data is extracted from the scanned bitmap data and the method of the present invention is applied to it, obtaining a high-quality result even by reduction printing or the like. Also, there is a copying machine (storage system) having a file server function, as shown in FIG. 14B. This copying machine has a function of previewing various kinds of data (e.g., PDF, JPEG, TIFF, and XPS data) stored in an internal folder. The preview requires high performance and satisfactory quality as a print result reference even upon reduction. For this purpose, a variety of data are transformed into vector data, and the method of the present invention is applied to them. Compared to reducing bitmap data, high-quality reduction processing with good performance can be implemented, coping with an advanced preview.

A simplest vector data reduction method is a method of performing transform processing using a transform matrix. For a convex figure, the number of portions which readily disappear upon reduction is small, so the convex figure may be reduced by multiplying an edge by a general transform matrix whose processing is simple. For a figure (concave figure) other than the convex one, the number of portions which readily disappear upon reduction is large, and thus the reduction method according to the embodiment is effective. Reduction processing can, therefore, be efficiently performed by switching between transform processing using a transform matrix and the method of the present invention, based on whether the object is a convex figure. Whether the object is a convex figure can be easily determined by determining whether all the exterior products of adjacent edges have the same sign, as shown in FIG. 15. Note that the method of determining whether the object is a convex or concave figure is not limited to this, and any method is used as long as the feature of a figure can be determined. It suffices to make this determination after the processing of the edge extraction unit 14 shown in FIG. 6, and determine a method to be applied, based on the characteristics of an object.

This reduction processing is similarly implemented not by the printer driver but in a printer. In other words, even a controller unit 22 in FIG. 3 can execute the same processing as the above-described one.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-218006, filed Sep. 18, 2009 and 2010-196099, filed Sep. 1, 2010, which are hereby incorporated by reference herein in their entirety.

What is claim is:

1. An image processing apparatus which performs reduction processing for rendering data in accordance with a reduction ratio, the apparatus comprising at least one processor which functions as:
   an edge extraction unit configured to extract edges from a contour of an object in the rendering data;
   a saved line specification unit configured to specify, out of lines including the extracted edges, lines each having an outer shape feature of the object as saved lines which are lines not subjected to thinning processing; and a thinning processing unit configured to determine lines out of lines other than the saved lines in the object and thin out the determined lines, thereby performing the reduction processing for the rendering data, wherein the saved line specification unit specifies saved lines by determining the outer shape feature of the object in accordance with characteristics of the extracted edges.

2. The apparatus according to claim 1, wherein the edge extraction unit extracts, as an edge, a continuous vector from an inflection point at which a positive/negative sign changes along at least either of an X-axis and a Y-axis on the contour of the object, to another inflection point, and when a line includes, as a characteristic of the edge on the line, one of a start point, end point, and intersection point of the edge, and an inflection point between edges, the saved line specification unit determines that the line has an outer shape feature of the object, and specifies the line as the saved line.

3. The apparatus according to claim 1, further comprising combination unit combines edges divided by thinning out the line by the thinning processing unit.

4. The apparatus according to claim 3, wherein the thinning processing unit includes a calculation unit configured to calculate the number of lines which form an object to be processed, a determination unit configured to determine the number of lines to be thinned out in accordance with the reduction ratio, and a thinning unit configured to thin out lines from lines of the object.

5. The apparatus according to claim 4, wherein a method of combining the divided edges by the combination unit is to combine a start point of an edge on a start point side of an edge before division, out of the divided edges, and an end point of the other divided edge, thereby newly creating an edge.

6. The apparatus according to claim 4, wherein a method of combining the divided edges by the combination unit is to move at least either of the divided edges in a direction in which the divided edges come close to each other, thereby combining the divided edges.

7. The apparatus according to claim 4, wherein the edge extraction unit extracts edges from respective objects in rendering data containing a plurality of objects, and the combination unit merges the edges of the respective objects that have undergone the reduction processing.

8. The apparatus according tone of claim 4, wherein when the number of lines determined by the determination unit is larger than the number of lines other than the saved lines in the object, the thinning unit thins out lines from the saved lines by a difference in number.

9. The apparatus according to claim 4, wherein when the number of lines determined by the determination unit is larger than the number of lines other than the saved lines in the object, the thinning unit thins out lines contained in the object at predetermined intervals.

10. The apparatus according to claim 4, wherein when the number of lines determined by the determination unit is larger than the number of lines other than the saved lines in the object, the thinning unit thins out lines contained in the object at intervals at which successive lines are not thinned out.

11. The apparatus according to claim 4, wherein when the number of lines determined by the determination unit is larger than the number of lines other than the saved lines in the object, the thinning unit does not thin out a line in the object regardless of the number of lines determined by the determination unit.

12. The apparatus according to claim 4, wherein when the number of lines determined by the determination unit is larger than the number of lines other than the saved lines in the object, the thinning unit thins out only lines other than the saved lines out of lines of the object.

13. The apparatus according to claim 1, wherein the reduction processing is possible along at least either of an X-axis and a Y-axis.

14. The apparatus according to claim 1, wherein whether the object is a convex figure or a concave figure is set as a determination criterion, and when the object is a convex figure, the reduction processing by the thinning processing unit is applied.

15. A method of controlling an image processing apparatus which performs reduction processing for rendering data in accordance with a reduction ratio, the method comprising:

an edge extraction step of causing an edge extraction unit of the image processing apparatus to extract edges from a contour of an object in the rendering data;

a saved line specification step of causing a saved line specification unit of the image processing apparatus to specify, out of lines including the extracted edges, lines each having an outer shape feature of the object as saved lines which are lines not subjected to thinning processing; and a thinning processing step of causing a thinning processing unit of the image processing apparatus to determine lines out of lines other than the saved lines in the object and thin out the determined lines, thereby performing the reduction processing for the rendering data, wherein in the saved line specification step, saved lines are specified by determining the outer shape feature of the object in accordance with characteristics of the extracted edges.

16. A non-transitory computer-readable medium storing a program causing a computer to function as an edge extraction unit configured to extract edges from a contour of an object in rendering data, a saved line specification unit configured to specify, out of lines including the extracted edges, lines each having an outer shape feature of the object as saved lines which are lines not subjected to thinning processing, and a thinning processing unit configured to determine lines out of lines other than the saved lines in the object and thin out the determined lines, thereby performing reduction processing for the rendering data, wherein the edge extraction unit extracts portions serving as the edges using vectors of the contour of the object, and the saved line specification unit specifies saved lines by determining the outer shape feature of the object in accordance with characteristics of the extracted edges.

* * * * *